United States Patent [19]

Kamogawa et al.

[11] 4,267,796
[45] May 19, 1981

[54] APPARATUS FOR DEVELOPING ELECTROSTATIC LATENT IMAGE

[75] Inventors: Nin-ichi Kamogawa; Yoshio Yamazaki, both of Hachioji, Japan

[73] Assignee: Konishiroku Photo Industry Co., Ltd., Tokyo, Japan

[21] Appl. No.: 32,381

[22] Filed: Apr. 23, 1979

[30] Foreign Application Priority Data

Apr. 28, 1978 [JP] Japan ................................. 53/50092

[51] Int. Cl.³ .......................................... G03G 15/09
[52] U.S. Cl. .............................. 118/658; 355/3 DD
[58] Field of Search ............ 118/658, 657; 355/3 DD; 430/122

[56] References Cited

U.S. PATENT DOCUMENTS

| | | | |
|---|---|---|---|
| 3,402,698 | 9/1968 | Kojima et al. | 118/658 |
| 3,626,898 | 12/1971 | Gawron | 118/658 |
| 4,086,873 | 5/1978 | Morita et al. | 118/658 |
| 4,166,263 | 8/1979 | Harada et al. | 118/658 X |

Primary Examiner—John P. McIntosh
Attorney, Agent, or Firm—Bierman & Bierman

[57] ABSTRACT

A magnetic brush developing apparatus for use in an electrostatic recording machine has a peripheral surface rotatable for carrying a single-component developer through magnetic field zones of adjacently alternating polarities including feed-in and feedback zones on opposite sides of a developing zone. The relative strengths of the fields are arranged so that the magnetic field density concentration point is offset from the developing zone so as to prevent image degradation by accumulation of excess developer at the developing zone.

3 Claims, 4 Drawing Figures

APPARATUS FOR DEVELOPING ELECTROSTATIC LATENT IMAGE

BACKGROUND OF THE INVENTION

1. Field of the Invention

The present invention relates to an electrostatic image developing machine and in particular to a developing apparatus for developing an electrostatic image produced on a recording or an image receiving medium in accordance with electrostatic recording operation by using a developing agent of single-component series which includes no carrier but only toner as a main component.

2. Description of the Prior Art

In general, as the method for developing an electrostatic latent image produced by an electrophotographic or electrostatic recording process, there have been hitherto known a magnetic-brush developing method, a cascade developing method or the like in which a developing composition of two-component series (i.e. containing at least two components, carrier particles and toner particles) is used. Although these methods are certainly advantageous in that an image having excellent image quality can be reproduced, there are common drawbacks ascribable to the two-component developing compositions such that the carrier undergoes fatigue and the mixing ratio of carrier and toner is undesirably subjected to variation.

The disadvantages described above are essentially absent in the case of the developing method in which the developing agent of a single-component series containing no carrier but only the toner as a main component is used.

Lately, there has been developed a developing machine such as shown in FIG. 1 which is adapted to developing the electrostatic latent image by using the developing agent of single-component series containing as a main component a toner which exhibits ferromagnetism. Referring to FIG. 1, the developing apparatus comprises a rotatable drum 1 having a photoelectric light sensitive layer deposited on the outer peripheral surface thereof and a cylindrical rotatable sleeve 3 of a non-magnetic material which is disposed in opposition to the drum 1 with a gap 2 relative to the outer periphery of the latter, the sleeve 3 being adapted to be rotated in the direction opposite to that of the drum 1, as indicated by respective arrows. A tonor container 5 is provided in combination with the non-magnetic rotating sleeve 3 so as to apply the magnetic toner 4 to a circumferential surface of the sleeve 3 at a location exept for the region defining the gap 2. Disposed stationarily within the rotatable sleeve 3, a small distance from the inner peripheral wall thereof, are a developing magnet 6 at a position aligned with the gap 2, a toner introducing magnet 7 at a position upstream of the developing magnet 6 as viewed in the rotating direction of the sleeve 3, a toner feedback magnet 8 positioned downstream of the developing magnet 6, and a series of toner feeding or transporting magnets 9, 10 and 11 for feeding the toner towards the gap 2 from the toner container 5. These magnets 6 to 11 are fixedly supported by a holding member 12 and so arrayed that the polarities of these magnets are alternately reversed as viewed in the rotating direction of the sleeve 3 and as shown in FIG. 1. Reference numeral 13 denotes a trimming plate for regulating the thickness of toner layer (not identified by a reference numerical).

With the structure of the developing machine described above, the toner 4 is deposited on the outer peripheral surface of the cylindrical sleeve 3 under the influence of the magnetic force, for example magnets 9 and 10, and fed out from the toner container 5 through the trimming plate 13, in the form of a toner layer having a constant thickness, as the sleeve 3 is rotated. Then the toner layer is successively moved to gap 2 according to the rotation of the sleeve 3 under the magnetic force of magnets 11, 7 and 6. At the region of the gap 2, the toner layer is caused to fluff or expand radially outwardly under the action of a magnetic field produced by the developing magnet 6 in cooperation with the toner introducing magnet 7 and the toner feedback magnet 8, whereby the toner is brought into sliding contact with the outer peripheral surface of the rotating drum 1. Accordingly, by imparting a required quantity of electric charge to the toner, the electrostatic latent image produced in the light sensitive layer 14 (see FIG. 2) of the rotating drum 1 will attract the toner particles which are thus deposited on the outer peripheral surface of the drum in a pattern corresponding to the latent image, thereby to develop the electrostatic latent image. The toner image thus developed is subsequently transferred to a conventional copy sheet such as plain paper and fixed through a well known process.

The developing apparatus described above suffers from drawbacks ascribable to the use of the magnetic toner. More specifically, the toner particles will likely tend to be deposited in the form of particle stacks on the surface of the light sensitive layer 14 of the drum 1 which serves as the image carrier, as is illustrated in FIG. 2, in which the toner particle stacks are denoted by reference numeral 15. Such particles stacks will involve degradation in the sharpness of the toner image itself and hence result in remarkable deterioration in the quality of the reproduced image after the transfer to the copy sheet, because the toner particle stacks 15 are disintegrated during the transfer process which is carried out with the copy sheet being snugly pressed against the light sensitive layer 14 of the drum 1, whereby the loose toner particles will be dispersed outwardly beyond the outline of the image to be reproduced, thereby to blur the image.

In addition, it is observed that some toner particles will tend to remain as deposited on the light sensitive layer 14 in the peripheral area around an inherent image region 16, as the result of which a shadow image 17 is developed to blur the reproduced image, as illustrated in FIG. 3.

Although the causality of the phenomena described above has not been completely elucidated yet, it is believed that the occurrence of such undesirable phenomena is ascribable to the absence of the carrier exhibiting a scraping action. In conjunction with this, it should be mentioned that the carrier is usually present in a quantity about one hundred times as large as the toner.

Further, the developing apparatus shown in FIG. 1 has an additional disadvantage in that the height of the bulge or rise-up of the toner particles produced under the influence of the developing magnet 6 and so forth will remain relatively low because the developing agent as employed is of the single-component series, whereby the gap 2 can not be implemented in a large size, imposing a high precision requirement in respect of the configurations and positional relationship of the rotating drum 1 and sleeve 3.

SUMMARY OF THE INVENTION

An object of the present invention is therefore to eliminate the drawbacks of the hitherto known developing machines such as described above and to provide an improved developing apparatus which is capable of developing an electrostatic latent image by using a magnetic toner with high sharpness and contrast, while the precision requirement imposed on the structural design of the apparatus can be significantly reduced.

In the following, an exemplary embodiment of the invention will be described in detail by referring to the drawings.

DETAILED DESCRIPTION OF THE PREFERRED EMBODIMENT

Figure 1:
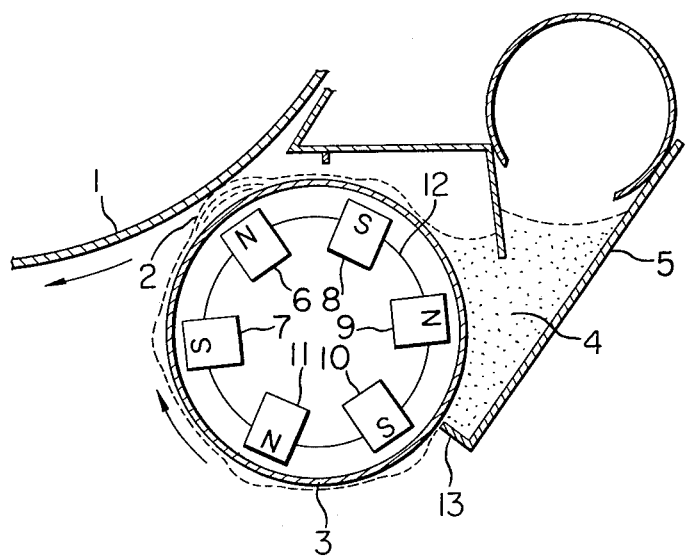
FIG. 1 is a schematic sectional view to illustrate an electrostatic latent image developing apparatus to which the principle of the invention can be applied.

Now, the invention will be described in connection with the exemplary embodiment thereof shown in the drawings. All of the Figures are used again for description of the principle of the present invention.

According to a general aspect of the invention, there is proposed that the toner introducing or feed-in magnet 7 located upstream of the developing magnet 6 as viewed in the rotating direction of the sleeve 3 be constituted by a magnet having a magnetic flux density higher than that of the toner feedback magnet 8 positioned downstream of the developing magnet 6. For example, when a magnet having a magnetic flux density of 1400 gauss is employed for the developing magnet 6, the magnet flux density of the toner introducing or feed-in magnet 7 is selected to be equal to 1300 gauss, while that of the toner feedback magnet 8 is selected at 900 gauss.

Figure 2:
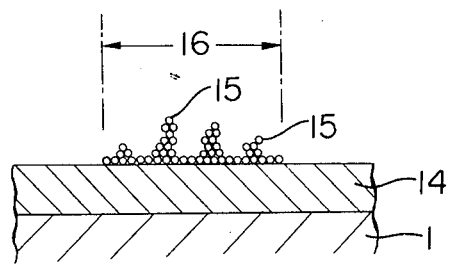
FIGS. 2 and 3 are diagrams to illustrate disadvantages of the hitherto known developing apparatus.
Figure 3:
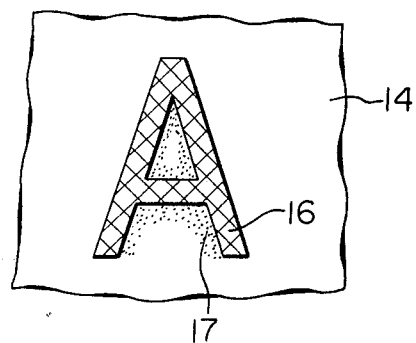
Figure 4:
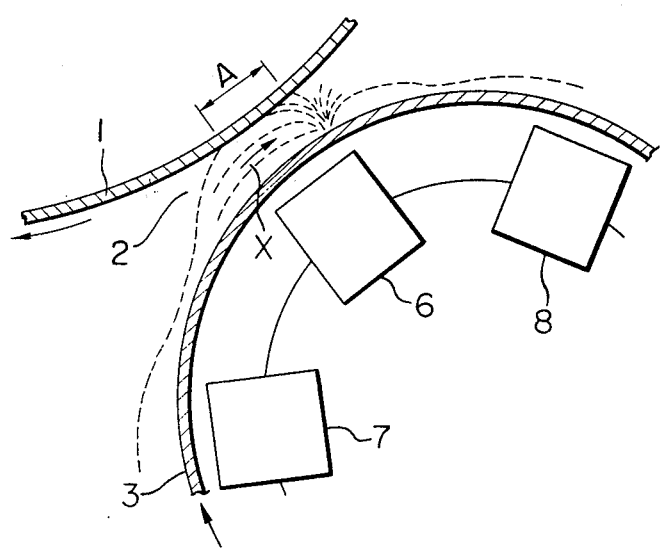
FIG. 4 is a schematic diagram to illustrate the principle of the invention.

With the structure of the electrostatic latent image developing apparatus according to the invention, the fluffing expansion or bulge of the toner layer produced at the region of the gap 2 between the outer peripheral surface of the rotating drum 1 and the outer peripheral surface of the sleeve 3 is restrained in dependence on the direction of the magnetism line which is predetermined by the relationship in the magnetic flux density among the developing magnet 6, the toner introducing magnet 7 and the toner feedback magnet 8, as is illustrated in FIG. 4. More specifically, bacause the magnetic flux density of the toner introducing magnet 7 is higher than that of the toner feedback magnet 8, the concentrating point of the magnetic fluxes will lie at a position offset outwardly from the center of the developing magnet 6 in the downstream direction, whereby the toner particles are held on the surface of the sleeve 3 by the attracting force in the direction substantially along the outer peripheral surface of the rotating sleeve 3 at the region of the gap 2, as indicated by an arrow X. As a consequence, the toner particles on the surface of the drum 1 other than those forceably attracted onto the surface of the drum 1 under the electrostatic attracting force of the electrostatic latent image, e.g. the rather loosely aggregated toner particles of the stacks 15 at the middle or top portion thereof as well as the toner particles dispersed in the peripheral areas around the latent image (refer to FIGS. 2 and 3) will be scraped off by the succeeding portion of the toner fluff or bulge produced and held on the sleeve 3 by the magnetic attracting force X and returned onto the rotating sleeve to be transported toward the toner feedback magnet 8. In this manner, a clear and sharp toner image is produced on the peripheral surface of the drum 1, resulting in a high quality of the reproduced image after the transfer to a copy sheet.

In contrast, in the case where the toner feed-in magnet 7 has a magnetic flux density equal to that of the toner feedback magnet 8, the scraping action can not be attained since only the toner particles held on the sleeve 3 by the magnetic force of the developing magnet 6 in the direction substantially perpendicular to the peripheral surface of the drum 1 are deposited on the drum surface at the gap 2.

It is possible to bring the rotating drum into contact with the toner particle layer held on the sleeve 3 by the magnetic force having a component of force in the direction parallel to the peripheral surfaces of the drum 1 and the sleeve 3 at the gap 2 by correspondingly inclining the magnetized axis of the developing magnet 6 relative to the direction perpendicular to the inner peripheral surface of the sleeve 3. However, with the arrangement according to the invention described above, the region A over which the rotating drum 1 can contact with the fluffed toner portion on the sleeve 3 may have a larger area as can be seen from FIG. 4, whereby a relatively lenient tolerance is allowed in respect of the precision of the size of the gap 2 between the drum 1 and the sleeve 3.

It should be mentioned that similar results action may be attained by constituting the toner feedback magnet 8 by a magnet having a higher magnetic flux density than that of the toner feed-in magnet 7 in place of the arrangement illustrated in FIG. 4. However, in this case, there may undesirably arise a possibility that the toner particles which are not subjected to the magnetic holding force in parallel to the peripheral surface of the rotating sleeve 3 will be positioned downstream of the location on the drum surface 1 subjected to development, resulting in that undesirable deposition of the toner particles will take place.

The developing agent to be employed in the developing apparatus according to the invention should necessarily contain magnetic toner, which is preferably to be additionally electrically insulative. If electrically conductive toner is employed, there is a tendency that the sharpness of the image produced by transferring electrostatically the developed image onto an ordinary sheet or paper becomes degraded. For electrically charging the insulative toner, there are known methods of applying electric charge to the toner layer through external means such as corona discharge as described in U.S. Pat. No. 3,645,770, or of utilizing frictional electricity produced by friction with the sleeve, the light sensitive layer and the like, or a method of utilizing the frictional electricity produced by the friction among the toner particles. According to the last mentioned method, which has been found to be the most preferable among the three, particles of a material (usually a pulverized magnetizable material) which takes a position on the frictional series different from that of the matrix resin of the toner particle are dispersed as exposed on the toner particle, and positive and negative charge dots in a discrete pattern are produced on the surface of the toner through the friction among the toner particles. According to this method, the intended development can be carried out without requiring any additional processing regardless of the polarity of the electrostatic latent image to be developed.

It will be self-explanatory that the toner employed in the developing apparatus according to the invention may be admixed with a fluidity promoting agent such as pulverized silica.

From the foregoing description, it will now be appreciated that the electrostatic latent image developing apparatus according to the invention is capable of producing a toner image having significantly improved sharpness through a very simple construction which evades severe requirements on the precision in dimension.

What is claimed is:

1. In a magnetic brush developing apparatus for use in an electrostatic recording machine for forming a copy of an original and including a rotatably disposed electrostatic latent image carrying member and dispenser means for holding a supply of single-component magnetic developer, carrying means between said dispenser means and said image carrying member and having a peripheral surface arranged for rotation in a direction opposite the image carrying member for transporting the developer on said peripheral surface from an upstream feed-in zone to a downstream feedback zone through a developing zone therebetween, said developing zone being located adjacent the image carrying member such that at least some of the developer is selectively attracted from the peripheral surface developing zone to the image carrying member in accordance with an electrostatic image pattern of the original impressed thereon, and magnetic means stationarily disposed with respect to said carrying means for forming magnetic fields of adjacently alternating polarities on said peripheral surface to attract the developer for transport from the dispensing means and to and through said developing zone as said peripheral surface is rotated, the magnetic field at said developing zone being stronger than the fields at said feed-in and feedback zones, and the magnetic fields at said feed-in and feedback zones being unequal in strength so as to offset the concentration point of the composite magnetic field density on said carrying means peripheral surface away from said developing zone adjacent the image carrying member, said offset being effective to prevent the accumulation on said image carrying member of excess developer transported on said peripheral surface to the developing zone and not attracted to the image carrying member for forming a toner image thereon in accordance with the image pattern of the original, whereby said excess developer is attracted to said peripheral surface at said offset magnetic field density concentration point remote from said image carrying member, the attraction of excess developer away from said image carrying member resulting in the creation of a notably sharpened toner image on the image carrying member.

2. In a magnetic brush developing apparatus in accordance with claim 1, said magnetic field at said feed-in zone being stronger than the magnetic field at said feedback zone so as to locate said offset magnetic field density concentration point downstream of said developing zone.

3. In a magnetic brush developing apparatus in accordance with claim 1, said magnetic field at said feedback zone being stronger than the magnetic field at said feed-in zone so as to locate said offset magnetic field density concentration point upstream of said developing zone.

* * * * *